Patented Dec. 13, 1949

2,491,287

UNITED STATES PATENT OFFICE 2,491,287

FUNGISTATIC PLASTICS

Howard E. Smith, Briarcliff Manor, and Walker Harden, Scarborough, N. Y., assignors, by mesne assignments, to Insl-X Corporation, Briarcliff Manor, N. Y., a corporation of New Jersey No Drawing. Application August 19, 1947, Serial No. 769,546

8 Claims. (Cl. 106—15)

This invention relates to a fungistatic molding composition and a process of making the same.

An object of this invention is to provide a molding composition which contains a toxicant which is stable under heat and pressure and which is in sufficient concentration so that when an article is molded from the composition the resulting article will be resistant to attack by fungi.

In order to achieve these results three things are necessary. First, a toxicant must be found with sufficient fungicidal toxicity so that it can be attenuated to a degree that will permit the finished molding to retain satisfactory mechanical and electrical properties. Second, the toxicant must be sufficiently heat stable and inert so that the normal process of setting-up or molding the plastic will not adversely affect said toxicant. Third, a method must be developed for incorporating relatively small quantities of the fungicide into the molding powder in such a way that all samples of moldings exhibit similar fungicidal characteristics.

Accordingly, another object of this invention is to provide a molding powder which contains a fungicide evenly distributed throughout and in sufficient concentration to produce a finished molded article which is not attacked by fungus.

Another object of the invention is to provide a process for incorporating a fungicide evenly throughout a molding powder.

Another object of the invention is to provide a phenolic molding powder which will have fungicidal properties when molded.

Another object of the invention is to provide a plasticizing composition for incorporation into molding powder which is adapted to give the molding powder a fungicidal property.

Another object of the invention is to provide a method of incorporating a fungicide into a molding powder.

Another object of the invention is to produce a finished molded article having fungicidal properties, which article still has fungicidal properties after extensive leaching or scrubbing.

These and other objects ancillary thereto are accomplished by dissolving a phenyl mercuric type of fungicide in hydrogenated castor oil and in thoroughly mixing this solution with the molding powder.

The fungicides which may be employed are the phenyl mercury fungicides, particularly phenyl mercuric phthalate, phenyl mercuric salicylate and phenyl mercuric O-benzoic sulphimide.

Hydrogenated castor oil is unique in its ability to dissolve these phenyl mercury compounds. The hydrogenated castor oil is a wax-like solid and when heated and thoroughly agitated with the phenyl mercury compound it is capable of forming a solution with 50% of the phenyl mercury compound. At least 20% of the phenyl mercury compound should be used with 80% of the hydrogenated castor oil to produce the desired results without over-plasticizing the resin. The amount obviously will depend upon the hardness of the finished article which it is desired to make.

Various molding materials may be used as the base of the molding powder. The types of molding materials which may be employed include phenol-aldehyde resins, for example phenol formaldehyde; urea-aldehyde resins (urea-formaldehyde, for example); aniline-aldehyde resins; melamine aldehyde resins; coumarone indene resins; alkyd resins, for example glycerolphthalic acid resins; casein aldehyde plastic compositions; cellulosic plastics such as the cellulose esters (cellulose acetate, cellulose acetate propionate, cellulose butyrate, cellulose nitrate, for example) cellulose ethers such as ethyl cellulose, ethoxycellulose, cellulose ether esters such as methyl cellulose acetate, etc. The hydrogenated castor oil solutions may also be incorporated into polymer compositions including polyvinyl derivatives such as polyvinyl acetate, polystyrene, copolymers of polyvinyl chloride with butadiene, acrylo nitrile etc; polyamides; polyethylene; polyvinylidene chloride, etc. Various fillers, such as wood flour, cotton, other cellulose fibers, glass fibers, and similar materials may be added to the compositions to improve the strength, increase the bulk and/or decrease the cost of the finished product.

The novel features characteristic of this invention are set forth with particularity in the appended claims. The invention itself, however, both as to its organization and its method of operation, together with additional objects and advantages thereof, will best be understood from the following description of specific embodiments.

Example 1

Hydrogenated castor oil is heated to about 85° C. when it liquefies to a considerable extent. While intensely heating the hydrogenated castor oil with a shearing type of heating mechanism an equal weight of phenyl mercuric phthalate or similar compound is added. The beating and heating is continued until a solution of the phenyl mercuric phthalate in the hydrogenated castor oil is obtained.

Example 2

| | Parts by weight |
|---|---|
| Phenol Formaldehyde Resin Powder ("B" state) | 49 |
| Wood flour | 45 |
| Hexamethylene tetramine | 1 |
| 50% hydrogenated castor oil—50% of phenyl mercuric phthalate | 5 |

This composition is molded into disks of one square inch area using the following cycle:

| | | |
|---|---|---|
| Charge | grams | 5 |
| Pressure | p. s. i. | 3000 |
| Temperature | ° C. | 160–165 |
| Time | minutes | 5 |

Example 3

| | Parts by weight |
|---|---|
| Phenol Formaldehyde Resin Powder ("B" state) | 49 |
| Wood flour | 45 |
| Hexamethylene tetramine | 1 |
| 50% hydrogenated castor oil—50% phenyl mercury O-benzoic sulphimide | 5 |

This composition is molded similarly to Example 1.

Example 4

| | Parts by weight |
|---|---|
| Urea-formaldehyde resin powder | 48 |
| Wood flour impregnated with a small amount (less than 1%) of phosphoric acid | 46 |
| 60% hydrogenated castor oil—40% of phenyl mercuric salicylate | 6 |

This composition is molded under a pressure of 3000 p. s. i. and at a temperature of 135° C.

In order to test the fungistatic effectiveness of the molded phenolic disks nine samples were selected as follows: Three samples were selected having no added fungicide. Three samples, made according to Example 1 without further treatment, were selected, and three samples made according to Example 1, were baked at 65° C. for six hours and leached in running tap water for 18 hours thereafter. These samples were then tested against the standard spore mixture under the procedure described in Navy specification 52T15. The spore mixture was made up of the following organisms:

*Aspergillus niger*
*Aspergillus flavis*
*Penicillium lutium*
*Trichoderma T-1 USDA*

The results obtained were as follows:

It will be seen, therefore, that this invention provides a fungistatic molding powder which is stable and is effective to prevent attack by fungi in molded articles produced therefrom.

Although certain specific embodiments of this invention have been shown and described, it will be understood that many modifications thereof are possible. This invention, therefore, is not to be restricted except by the spirit of the appended claims.

We claim:

1. A fungistatic composition consisting essentially of an organic plastic molding material and an inert filler, said composition having dispersed throughout a solution of a phenyl mercuric carboxylate fungicide in hydrogenated castor oil in which the phenyl mercuric compound is 25–50% by weight of the total hydrogenated castor oil solution.

2. A fungistatic composition consisting essentially of an organic plastic molding material and an inert filler, said composition having dispersed throughout a solution of phenyl mercuric phthalate in hydrogenated castor oil in which the phenyl mercuric compound is 25–50% by weight of the total hydrogenated castor oil solution.

3. A fungistatic composition consisting essentially of an organic plastic molding material and an inert filler, said composition having dispersed throughout a solution of phenyl mercuric salicylate in hydrogenated castor oil in which the phenyl mercuric compound is 25–50% by weight of the total hydrogenated castor oil solution.

4. A fungistatic composition consisting essentially of an organic plastic molding material and an inert filler, said composition having dispersed throughout a solution of phenyl mercuric O-benzoic sulphimide in hydrogenated castor oil in which the phenyl mercuric compound is 25–50% by weight of the total hydrogenated castor oil solution.

5. A composition adapted to be added to plastic compositions to plasticize the composition and simultaneously make the said composition fungicidal consisting essentially of a solution of a phenyl mercuric carboxylate fungicide in hydrogenated castor oil in which the phenyl mercuric compound is 25–50% by weight of the total hydrogenated castor oil solution.

6. A composition adapted to be added to plastic compositions to plasticize the composition and simultaneously make the said composition fungicidal consisting essentially of a solution of phenyl mercuric phthalate in hydrogenated castor oil in which the phenyl mercuric compound is 25–50% by weight of the total hydrogenated castor oil solution.

7. A composition adapted to be added to plastic compositions to plasticize the composition and simultaneously make the said composition fungicidal consisting essentially of a solution of phenyl mercuric salicylate in hydrogenated cas-

| Sample | Toxicant | Treatment | Area of inhibition | | | Rating |
|---|---|---|---|---|---|---|
| | | | a | b | c | |
| 1 | None | None | 0 | 0 | 3 | Bad. |
| 2 | Phenyl Mercuric Phthalate (Ex. 1) | None | 3 | 3 | 3 | Good. |
| 3 | ----do---- | Baked 85° C. 6 hrs., Leached 8 hrs. | 3 | 3 | 3 | Do. | a—Number of plates showing inhibited growth zone—good.
b—a+number of plates with growth up to but not touching edge of specimen—good.
c—Total number of specimens plated.
NOTE 1.—c minus b equals number rated bad.
NOTE 2.—For "good" rating every plate of group must be good.

tor oil in which the phenyl mercuric compound is 25-50% by weight of the total hydrogenated castor oil solution.

8. A composition adapted to be added to plastic compositions to plasticize the composition and simultaneously make the said composition fungicidal consisting essentially of a solution of phenyl mercuric O-benzoic sulphimide in hydrogenated castor oil in which the phenyl mercuric compound is 25-50% by weight of the total hydrogenated castor oil solution.

HOWARD E. SMITH.
WALKER HARDEN.

REFERENCES CITED

The following references are of record in the file of this patent:

UNITED STATES PATENTS

| Number | Name | Date |
|---|---|---|
| 2,097,339 | Patterson et al. | Oct. 26, 1937 |
| 2,349,134 | Bradshaw | May 16, 1944 |
| 2,376,291 | Sowa | May 15, 1945 |
| 2,429,086 | Anderson | Oct. 14, 1947 |

OTHER REFERENCES

Hercules Ethyl Cellulose, a publication of the Hercules Powder Company, Wilmington, Delaware, March 1944, pages 34 and 35.